United States Patent
Kino et al.

(10) Patent No.: US 6,858,096 B2
(45) Date of Patent: Feb. 22, 2005

(54) ROLLING ELEMENT FOR A CONTINUOUSLY VARIABLE TRANSMISSION (CVT), A CVT USING THE ROLLING ELEMENT AND A METHOD FOR PRODUCING THE ROLLING ELEMENT

(75) Inventors: Nobuo Kino, Kanagawa (JP); Noriko Uchiyama, Kanagawa (JP); Takuro Yamaguchi, Kanagawa (JP); Keizo Otani, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/996,755

(22) Filed: Nov. 30, 2001

(65) Prior Publication Data

US 2002/0119858 A1 Aug. 29, 2002

(30) Foreign Application Priority Data

Dec. 25, 2000 (JP) .................................... 2000-391929

(51) Int. Cl.[7] .............................. C23C 8/22; C23C 8/32
(52) U.S. Cl. ...................... 148/219; 148/225; 148/233
(58) Field of Search ........................ 148/219, 233, 148/225, 218, 319

(56) References Cited

U.S. PATENT DOCUMENTS

| | | | |
|---|---|---|---|
| 4,415,378 A | * 11/1983 | McKinney et al. | 148/226 |
| 5,019,182 A | * 5/1991 | Arimi | 148/219 |
| 5,556,348 A | 9/1996 | Kokubu et al. | 476/40 |
| 5,702,540 A | * 12/1997 | Kubota | 148/223 |
| 5,855,531 A | * 1/1999 | Mitamura et al. | 476/46 |
| 6,018,854 A | * 2/2000 | Miyasaka | 29/1.22 |
| 6,051,080 A | 4/2000 | Kino et al. | 148/319 |
| 6,440,232 B1 | * 8/2002 | Takemura et al. | 148/319 |
| 2001/0016533 A1 | 8/2001 | Yoshida et al. | |

FOREIGN PATENT DOCUMENTS

| | | | | |
|---|---|---|---|---|
| JP | 62-033754 A | * | 2/1987 | C23C/8/22 |
| JP | 62-070512 A | * | 4/1987 | C21D/1/06 |
| JP | 05-195069 A | * | 8/1993 | C21D/1/18 |
| JP | 5-301165 | | 11/1993 | |

OTHER PUBLICATIONS

Machine Translation of JP 05–301165 A.*
"Surface Roughness—Definitions and Designation," Japanese Industrial Standard, JIS B 0601 (1994), UDC 003.62:621.7.015, pp. 1–25.
"Methods of Measuring Case Depth Hardened by Carburizing Treatment for Steel," Japanese Industrial Standard, JIS G 0557 (1996), UDC 669.14:620.178.1, pp. 1–6.

* cited by examiner

*Primary Examiner*—Roy King
*Assistant Examiner*—Harry D Wilkins, III
(74) *Attorney, Agent, or Firm*—Foley & Lardner LLP

(57) ABSTRACT

A rolling element for a continuously variable transmission, including a plurality of rolling members having rolling contact portions that come into rolling contact with each other via lubricating oil. At least one of the rolling contact portions includes an outer surface layer having a surface microhardness of not less than Hv 750, a surface residual compressive stress of not less than 1000 MPa and a residual austenite content of not more than 10% by volume.

20 Claims, 4 Drawing Sheets

ROLLING ELEMENT FOR A CONTINUOUSLY VARIABLE TRANSMISSION (CVT), A CVT USING THE ROLLING ELEMENT AND A METHOD FOR PRODUCING THE ROLLING ELEMENT

BACKGROUND OF THE INVENTION

The present invention relates to a rolling element for use in a continuously variable transmission (CVT), such as a toroidal CVT, for automobiles. More specifically, this invention relates to the rolling element for the CVT which is improved in rolling contact fatigue life, and a method for producing the rolling element.

The toroidal CVT includes an input disk, an output disk and power rollers interposed between the input and output disks. Each of the power rollers includes inner and outer races and a plurality of balls between the races. The races have bearing surfaces contacted with the balls via lubricating oil. The inner race of the power roller has a traction surface contacted with a traction surface of each of the disks via lubricating oil. Rotation of the input disk is transmitted to the output disk by the traction drive produced between the traction surfaces of the disks and the traction surfaces of the power rollers.

U.S. Pat. No. 5,556,348 discloses input and output disks and a power roller for a toroidal CVT, which have traction surfaces formed by carburizing and finish grinding. U.S. Pat. No. 6,051,080 discloses a power roller for a toroidal CVT. A race of the power roller has a bearing surface formed by carburizing and finish grinding.

Further, Japanese Patent Application First Publication No. 5-301165 discloses a method for improving bending-fatigue strength of a carburized and quenched member. The carburized and quenched part having a surface abnormal-structure layer is subjected to shot peening to transform the surface abnormal-structure layer to martensite. Shots used in the shot peening have a particle diameter of not more than 0.1 mm.

SUMMARY OF THE INVENTION

When the toroidal CVT is driven, the input and output disks and the power rollers come into rolling contact with each other under a high loading force applied to the traction surfaces of the disks and the traction surfaces of the power rollers. At this time, a high contact surface pressure is exerted on the traction surfaces of the disks, the traction surfaces of the power rollers and the bearing surfaces of the races of the power rollers. For instance, the maximum contact surface pressure may reach 3 GPa or more on the bearing surfaces of the races. Under the high contact surface pressure, the traction surfaces and the bearing surfaces suffer from internal microstructural change at a depth position in which shearing stress caused due to Hertzian contact becomes maximum. The internal microstructural change is caused by foreign materials intervening between the traction surfaces of the disks and the power rollers and between the bearing surfaces of the races of the power rollers and the balls, or caused by rolling contact fatigue due to the rolling contact between the traction surfaces and between the bearing surfaces and the balls. Cracks will occur at the depth position in the traction surfaces of the races and the disks and the bearing surfaces of the races, which grow up to outer layers of the traction surfaces and the bearing surfaces to cause flaking or peeling thereof.

Further, when the balls roll on the bearing surfaces of the races of the power rollers, not only the high contact surface pressure but traction force and radial load are applied onto the bearing surfaces. This may cause microscopic metal-to-metal contact between the bearing surfaces and the balls or increase rolling friction resistance generated therebetween to thereby increase surface tangential force applied onto the bearing surfaces. Flaking will start from the outer layers of the bearing surfaces. As a result, rolling contact fatigue lives of the races will be deteriorated.

For the purpose of increasing volumetric capacity of the CVTs or reducing dimension thereof, there is a demand to improve rolling contact fatigue strength of rolling contact portions of a rolling element for the CVTs, such as the input and output disks and the power rollers of the toroidal CVT, by increasing hardness or resistance to crack in outer layers of the rolling contact portions.

An object of the present invention is to provide a rolling element for a continuously variable transmission (CVT) which is improved in rolling contact fatigue life, a CVT using the rolling element, and a method for producing the rolling element.

According to one aspect of the present invention, there is provided a rolling element for a continuously variable transmission, comprising:

a plurality of rolling members having rolling contact portions coming into rolling contact with each other via lubricating oil, wherein at least one of the rolling contact portions includes an outer surface layer having a surface microhardness of not less than Hv 750, a surface residual compressive stress of not less than 1000 MPa and a residual austenite content of not more than 10% by volume.

According to a further aspect of the present invention, there is provided a continuously variable transmission, comprising:

input and output disks arranged in a coaxial and spaced relation to each other; and a power roller interposed between the input and output disks, the power roller including an inner race, an outer race and a plurality of balls interposed between the inner and outer races, the inner race and the input and output disks having rolling contact portions coming into rolling contact with each other via lubricating oil, the inner and outer races having rolling contact portions coming into rolling contact with the balls via lubricating oil, wherein at least one of the rolling contact portions includes an outer surface layer having a surface microhardness of not less than Hv 750, a surface residual compressive stress of not less than 1000 MPa and a residual austenite content of not more than 10% by volume.

The at least one of the rolling contact portions may be a traction surface on the inner race of the power roller which is in contact with the input and output disks. The at least one of the rolling contact portions may be a traction surface on each of the input and output disks which is in contact with the inner race of the power roller. The at least one of the rolling contact portions may be a bearing surface on each of the inner and outer races which is in contact with the balls.

According to a still further aspect of the present invention, there is provided a method for producing a rolling element for a continuously variable transmission, the rolling element including a plurality of rolling members having rolling contact portions coming into rolling contact with each other via lubricating oil, at least one of the rolling contact portions including an outer surface layer, the method comprising:

subjecting a workpiece to either one of carburizing-quenching and carbonitriding-quenching;

subjecting an outer surface of the workpiece to shot peening; and subjecting the outer surface of the workpiece to finish grinding so as to provide the outer surface layer having a surface microhardness of not less than Hv 750, a surface residual compressive stress of not less than 1000 MPa and a residual austenite content of not more than 10% by volume.

The either one of carburizing-quenching and carbonitriding-quenching may be conducted using either one of a vacuum furnace and a plasma furnace. The workpiece may be made of steel containing Cr in an amount of 1.2 to 3.2 mass percent and Mo in an amount of 0.25 to 2.0 mass percent. The method may further include subjecting the outer surface of the workpiece to grinding between the either one of carburizing-quenching and carbonitriding-quenching, and the shot peening. The either one of carburizing-quenching and carbonitriding-quenching may be conducted using a gas furnace. The shot peening may be conducted using shots having an average particle diameter of not more than 0.1 mm. The outer surface of the workpiece may have a hardness of not less than Hv 720 before the shot peening. The hardness of the outer surface of the workpiece may be not more than Hv 760. The residual austenite content in the outer surface of the workpiece may be not less than 20% before the shot peening. The residual austenite content in the outer surface of the workpiece may be not less than 30% before the shot peening.

DETAILED DESCRIPTION OF THE INVENTION

Figure 1:
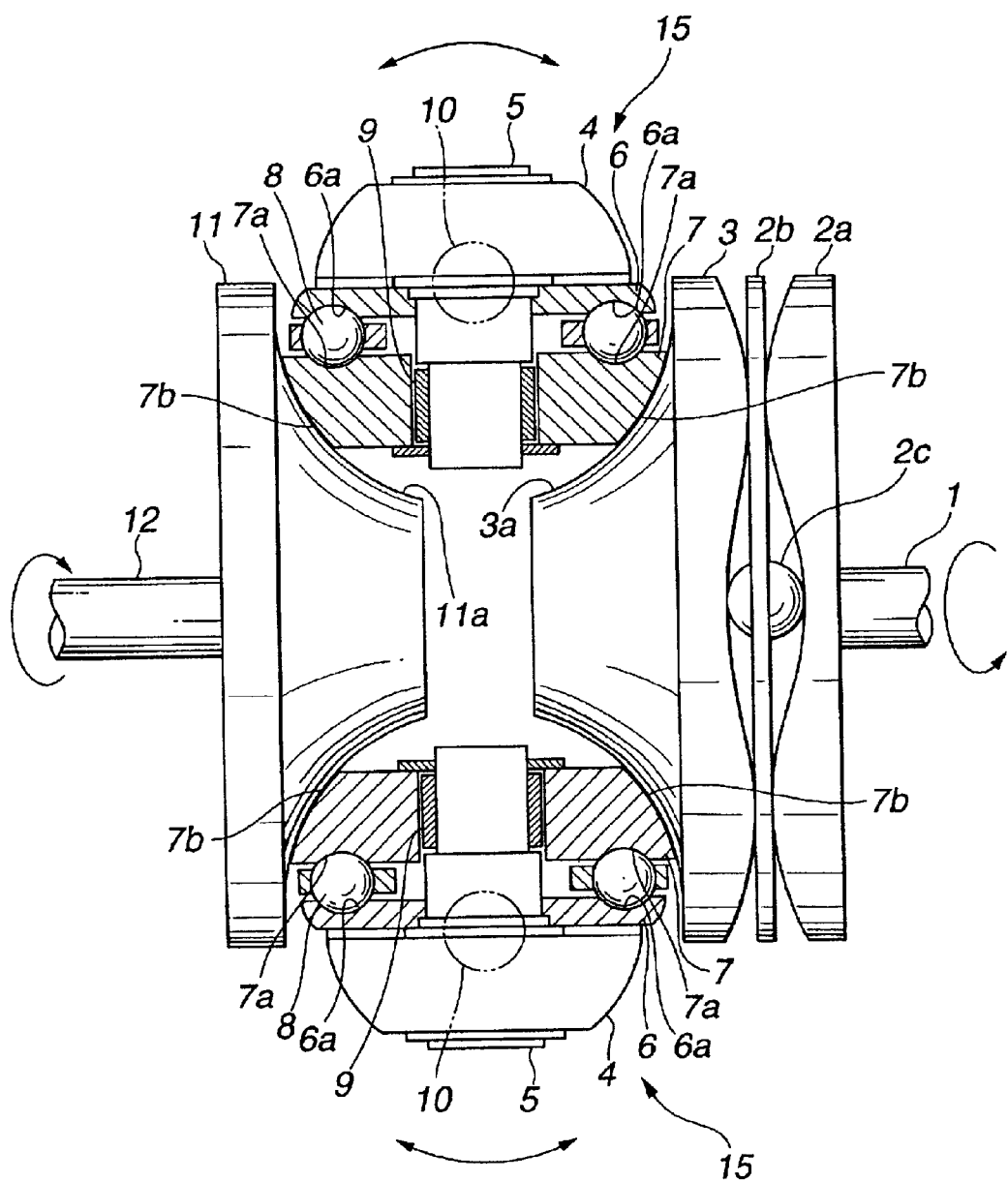
FIG. 1 is an explanatory diagram, partially in section, of a basic structure of a toroidal continuously variable transmission (CVT)

Referring now to FIG. 1, there is shown a toroidal continuously variable transmission (CVT), to which a rolling element according to a preferred embodiment of the present invention can be applied.

As illustrated in FIG. 1, the toroidal CVT includes input disk 3 connected with input shaft 1 through loading cam device 2 that includes cam plate 2a, retainer 2b and cam roller 2c. Output disk 11 is fixed to output shaft 12 axially aligned with input shaft 1. Input disk 3 and output disk 11 having substantially the same shape are arranged in coaxial and symmetrical relation to each other as shown in FIG. 1. Input disk 3 and output disk 11 have axially opposed traction surfaces 3a and 11a cooperating to define a toroidal cavity. A pair of power rollers 15, 15 are rotatably disposed within the toroidal cavity in contact with traction surface 3a of input disk 3 and traction surface 11a of output disk 11.

Each power roller 15 includes a pair of trunnions 4, 4 and pivot shafts 5, 5 mounted to trunnions 4, 4, respectively. Outer race 6 is fixed to each of pivot shafts 5, 5. Inner race 7 is rotatably mounted to each pivot shaft 5 through radial needle bearing 9 and spaced from outer race 6 in an axial direction of pivot shaft 5. Inner race 7 has traction surface 7b on the outer circumferential periphery, which is in contact with traction surfaces 3a and 11a of input and output disks 3 and 11 via lubricating oil (traction oil) having a large viscose friction resistance. Traction surfaces 3a and 11a are brought into rolling contact with traction surface 7b. Outer and inner races 6 and 7 have bearing surfaces 6a and 7a opposed to each other, between which a plurality of balls 8 are interposed. Bearing surfaces 6a and 7a are in contact with balls 8 via the lubricating oil. Bearing surfaces 6a and 7a form grooves configured so as to receive balls 8. Bearing surfaces 6a and 7a are brought into rolling contact with balls 8.

When input shaft 1 of the thus-constructed CVT rotates, input disk 3 is rotated via loading cam device 2 including cam plate 2a, retainer 2b and roller 2c. This causes inner races 7, 7 of power rollers 15, 15 to rotate in contact with both of traction surface 3a of input disk 3 and traction surface 11a of output disk 11. Output disk 11 then is rotated together with output shaft 12. During transmission of rotation from input shaft 1 to output shaft 12, trunnions 4, 4 with inner races 7, 7 of power rollers 15, 15 are rotated about pivot 10 indicated by phantom line in FIG. 1, so that inner races 7, 7 are slantly moved relative to input and output disks 3 and 11. As a result, the contact between traction surfaces 7b, 7b of inner races 7, 7 and traction surfaces 3a and 11a of input and output disks 3 and 11 is displaced. The effective radii of input and output disks 3 and 11 vary, so that the speed ratio varies continuously to accelerate or decelerate the vehicle.

Namely, input and output disks 3 and 11 and each power roller 15, which are rolling members, have rolling contact portions that come into rolling contact with each other via the lubricating oil upon the rotation transmission of the CVT. The rolling contact portions includes traction surfaces 3a and 11a of input and output disks 3 and 11, traction surface 7b of inner race 7 of power roller 15, and bearing surfaces 6a and 7a of outer and inner races 6 and 7.

The preferred embodiment of the invention which is incorporated to the toroidal CVT explained above, now is explained. At least one of traction surface 3a and 11a of each disk 3 and 11, traction surface 7b of inner race 7, and bearing surface 6a and 7a of each race 6 and 7, includes an outer surface layer that has a surface microhardness of not less than Hv 750, a surface residual compressive stress of not less than 1000 MPa and a residual austenite content of not more than 10% by volume.

Here, the surface microhardness of the outer surface layer is determined by the following manner. Hardness distribution in a depth direction of the outer surface layer is measured using a microvickers hardness tester at a load of 10 g. The hardness measured at a depth of 5 $\mu$m from the outer-most surface of the outer surface layer is determined as the surface microhardness.

The reason for selecting the relatively low load in measurement of the surface microhardness is explained as follows. When the outer surface layer is formed by shot peening with shots having an average particle diameter of 0.1 mm or less, the base material of the outer surface layer is work-hardened to have an increased hardness. The hardness becomes maximum at a depth of approximately 10–30

µm from the outer-most surface of the outer surface layer. If the hardness is measured at an ordinary load of approximately 300 g as prescribed in JIS G0557, too large impression will be formed on the outer surface layer by the load to thereby deteriorate accuracy in measurement of the hardness.

Among the rolling contact portions of input and output disks 3 and 11 and power roller 15, traction surface 7b of inner race 7 of power roller 15 and bearing surfaces 6a and 7a of outer and inner races 6 and 7 thereof are required to have a larger rolling contact fatigue strength. Owing to the above-described properties of the outer surface layer, the rolling contact portion having the outer surface layer can be prevented from cracking that will occur from the outer surface layer because of increase in surface tangential force. Also, even when crack starts from an inner portion of the rolling contact portion which is located below the outer surface layer, the rolling contact portion can be prevented from suffering from growth of the crack into the outer surface layer. As a result, the rolling element can be improved in rolling contact fatigue strength and rolling contact fatigue life, and therefore, the CVT can be improved in durability. If the hardness and the residual stress of the outer surface layer are out of the above-described range, the outer surface layer will fail to effectively perform the functions of suppressing the occurrence of crack starting therefrom and the growth of crack starting from the inner portion.

A method for producing the rolling element for the toroidal CVT, according to the present invention, will be explained hereinafter. First, a workpiece is subjected to heat treatment including either one of carburizing-quenching and carbonitriding-quenching. Subsequently, an outer surface of the workpiece is subjected to shot peening and then finish grinding so as to provide the rolling element including the rolling contact portion formed with the above-described outer surface layer. Namely, the outer surface layer has the surface microhardness of not less than Hv 750 as measured at the load of 10 g, the surface residual compressive stress of not less than 1000 MPa and the residual austenite content of not more than 10% by volume.

Work-induced transformation from the residual austenite in the outer surface of the workpiece to martensite can be relatively simply achieved by shot peening. As a result of the work-induced transformation to martensite, the outer surface layer of the rolling contact portion causes the residual compressive stress, thereby increasing the surface hardness thereof. Consequently, the above-described improved properties of the rolling contact portion of the rolling element can be obtained. Further, the surface roughness of the outer surface of the workpiece which is deteriorated by shot peening, can be improved by finish grinding. Preferably, superfinishing is carried out subsequent to shot peening.

Further, it is preferable to conduct the carburizing-quenching or carbonitriding-quenching treatment using a vacuum furnace or a plasma furnace. The treatment can enhance the effects of applying the residual compressive stress to the outer surface layer of the rolling contact portion and increasing the surface hardness thereof. Also, the improved properties of the rolling contact portion of the rolling element can be stabilized by the treatment. In a case where the workpiece is subjected to carburizing-quenching or carbonitriding-quenching using the vacuum furnace or the plasma furnace, the outer surface of the workpiece will be prevented from suffering from a surface abnormal-structure layer, namely, an intergranular oxidizing zone. On the other hand, in the case of conducting gas carburizing-quenching or gas carbonitriding-quenching, the surface abnormal-structure layer will be formed. If the workpiece having the surface abnormal-structure layer is subjected to shot peening, the rolling contact portion of the rolling element will undergo uneven properties, for example, non-uniformity in surface residual compressive stress and surface hardness.

Further, the workpiece may be made of steel for machine structural use which contains Cr in an amount of 1.2 to 3.2 mass percent and Mo in an amount of 0.25 to 2.0 mass percent. Cr and Mo contained in the base material of the workpiece are essential to finely dispersing carbide in the base material to increase the hardness of the base material. Cr is essential to producing carbide of $M_3C$ or $M_{23}C$. Preferably, Cr is contained within a range 1.2 to 3.2 mass percent in order to stably perform the function and suppress increase in cost and decrease of machinability. Mo is added to the base material to stably deposit the carbide. Preferably, Mo is contained within a range of 0.25 to 2.0 mass percent in order to stabilize the carbide deposition and suppress increase in cost and decrease of machinability.

Further, the workpiece having the above-described chemical composition may be subjected to grinding after carburizing-quenching or carbonitriding-quenching, and then subjected to shot peening and finish grinding. Furthermore, if gas carburizing-quenching or gas carbonitriding-quenching is conducted, then the workpiece may be subjected to grinding before shot peening to eliminate the surface abnormal-structure layer formed by the heat treatment. The reason for conducting grinding before shot peening is that, if the workpiece having the surface abnormal-structure layer is subjected to shot peening, stability of the properties obtained after the shot peening will be undesirably affected.

Further, the shot peening can be conducted using shots having an average particle diameter of not more than 0.1 mm. If the shots having the average particle diameter of more than 0.1 mm are used, the residual compressive stress and the work hardening that are caused by the shot peening will become maximum at a relatively deep position in the outer surface of the workpiece. In such a case, the occurrence of cracking starting at an outer portion of the outer surface layer of the rolling contact portion of the rolling element may be less suppressed, while the growth of crack starting at the inner portion of the outer surface layer thereof may be restrained. Therefore, the use of the shots having the average particle diameter of more than 0.1 mm is undesirable.

The outer surface of the workpiece preferably has a Vickers hardness of not less than Hv 720 before being subjected to shot peening. In this case, the hardness is measured at a load of 300 g at a depth of 50 µm from an outer-most portion of the outer surface of the workpiece. If the hardness of the outer surface of the workpiece is less than Hv 720, the residual compressive stress and the work hardening will not be obtained stably and sufficiently after the shot peening. As a result, the average life of the rolling element will not be improved when subjected to a rolling contact fatigue life test as described later.

Further, the upper limit of the hardness of the outer surface of the workpiece is preferably Hv 760 as measured at the load of 300 g before shot peening. Namely, the hardness of the outer surface of the workpiece is preferably within the range of Hv 720 to Hv 760 before shot peening. In this case, the average rolling contact fatigue life of the rolling element can reach the maximum, and unevenness in the life can be suppressed. If the outer surface of the workpiece has the hardness larger than Hv 760 before shot peening, the residual compressive stress and work hardening cannot be produced sufficiently and stably upon shot peening. This is because, in the case of subjecting the outer surface of the workpiece having the hardness larger than Hv 760 to shot peening, an area rate of the carbide diffused and precipitated in the base material of the workpiece is increased and the residual austenite content is decreased. As a result, the rolling element fails to show improved average rolling contact fatigue life, though the life is somewhat increased.

The residual austenite content in the outer surface of the workpiece is preferably not less than 20% before the shot peening is conducted. The residual austenite in the outer surface of the workpiece is transformed to a work-induced martensite by shot peening, so that the residual compressive stress is applied to the outer surface layer of the rolling contact portion of the rolling element to thereby increase the surface hardness thereof. If the residual austenite content in the outer surface of the workpiece is not less than 20% before shot peening, the content of the work-induced martensite transformed from the residual austenite will be increased to sufficiently attain the effects of applying the residual compressive stress and increasing the surface hardness. This results in suppression of unevenness in rolling contact fatigue life of the rolling element. More preferably, the residual austenite content in the outer surface of the workpiece is not less than 30% before shot peening. In this case, the above-described effects can be more sufficiently obtained.

Further, the outer surface of the workpiece more preferably has the hardness of not less than Hv 720 and the residual austenite content of not less than 20% before shot peening. In this case, the rolling contact fatigue life of the rolling element can be prolonged, and unevenness in the life thereof can be suppressed for the same reasons as explained above.

EXAMPLES

The present invention is described in more detail by way of examples and comparative examples by referring to the accompanying drawings. However, these examples are only illustrative and not intended to limit a scope of the present invention thereto. In the following examples and comparative examples, a surface microhardness, a surface Vickers hardness and a rolling contact fatigue life were measured and evaluated by the following method.

Evaluation of Surface Microhardness

Hardness distribution in an outer surface layer of a specimen in a depth direction thereof was measured using a microvickers hardness tester (Full Automatic Microvickers Hardness Tester MF-IV2000, manufactured by NIPPON STEEL CO.). A load of 10 g was applied to an indenter of the microvickers hardness tester. The value measured at a depth of 5 $\mu$m from the outer-most surface of the outer surface layer was determined as the surface microhardness.

Evaluation of Surface Vickers Hardness

Hardness distribution in an outer surface layer of a specimen in the depth direction was measured using the same microvickers hardness tester as described above. A load of 300 g was applied to the indenter of the microvickers hardness tester. The value measured at a depth of 50 $\mu$m from the outer-most surface of the outer surface layer was determined as the surface Vickers hardness (See JIS G0557).

Evaluation of Rolling Contact Fatigue Life

Figure 2:
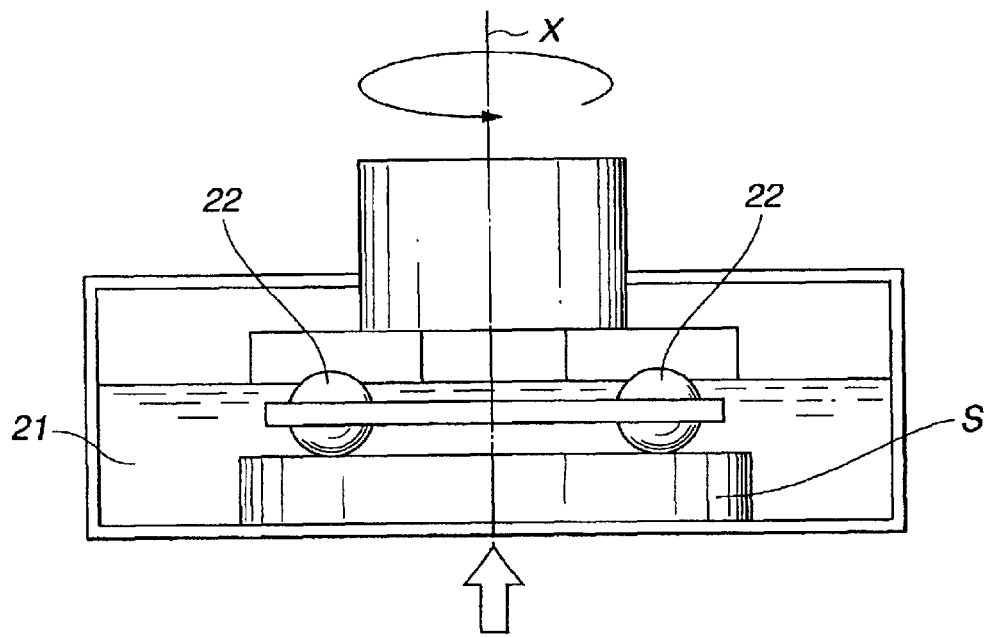
FIG. 2 is a schematically explanatory diagram of a thrust rolling contact fatigue tester used in examples of the present invention.

The rolling contact fatigue life was evaluated using a thrust rolling contact fatigue tester shown in FIG. 2. Four test pieces S each having a diameter of 60 mm and a thickness of 5 mm were prepared in each of examples and comparative examples. Each test piece S was repeatedly tested four times. As illustrated in FIG. 2, test piece S was set in contact with steel bearing balls 22 in traction oil 21. Test piece S was brought into rolling contact with three steel bearing balls 22, only two thereof shown in FIG. 2, having a diameter of 9.5 mm. During rolling contact, a thrust load of 5.23 GPa was applied to test piece S. Revolution number of a shaft about rotation axis X was 2000 rpm. The L50 life and the Weibull coefficient were calculated on the basis of the Weibull plot obtained from the test results.

Examples 1–7

The specimen was prepared in the following manner. The specimen as a workpiece was made of steel for machine structural use which had a chemical composition shown in Table 1.

TABLE 1

| Steel Sample | Chemical Composition (mass %) | | | | | | |
|---|---|---|---|---|---|---|---|
| No. | C | Si | Mn | Cr | Ni | Mo | V |
| A32 | 0.2 | 1.0 | 0.3 | 2.0 | 2.0 | 0.7 | 0.2 |

Figure 3:
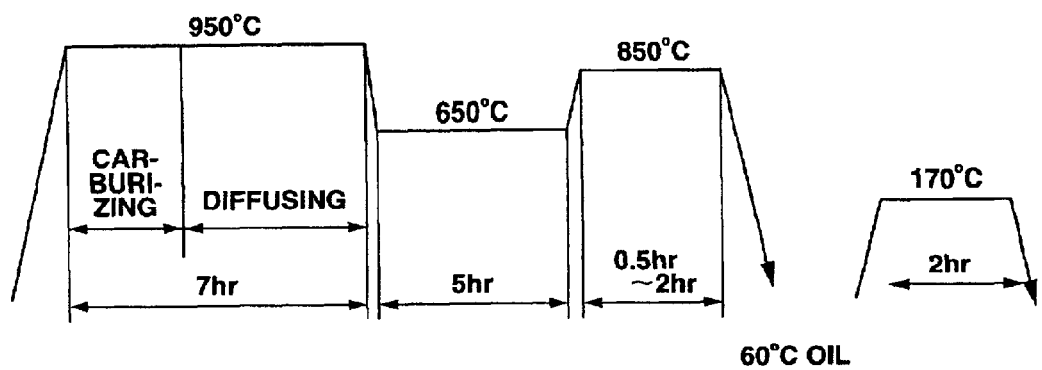
FIG. 3 is an explanatory diagram showing a heat pattern of a heat treatment carried out in the examples of the present invention.

The specimen was subjected to rough machining and heat treatment shown in FIG. 3, to provide a hardened outer surface layer. The specimen was subjected to carburizing, quenching and tempering under the heat treatment conditions shown in FIG. 3. The carburizing was carried out using a plasma furnace. In Examples 1–7, the ratio between carburizing time and diffusing time, and keeping time at 850° C. were appropriately adjusted so as to control a surface hardness and a surface residual austenite content in the outer surface layer of the specimen. Subsequently, the specimen was subjected to grinding with a machining allowance of 0.2 mm. The machining allowance was determined so as to completely eliminate a surface abnormal-structure layer, i.e., an intergranular oxidizing zone, that was formed when gas carburization was conducted as described in Examples 9 and 10.

The specimen heat-treated was then subjected to evaluations of the properties, namely, the surface Vickers hardness of the outer surface layer and the residual austenite content therein, as described above. The evaluation results were shown in Table 2.

Next, the specimen was subjected to shot peening and superfinishing. Upon the shot peening, steel beads having an average particle diameter of 60 $\mu$m were used as shots. The shooting time was set in a range of 30 to 120 sec., in which the shot peening was conducted varying the shooting conditions. Upon the superfinishing, the outer surface of the specimen was ground until reaching a targeted depth of approximately 10 to 30 $\mu$m. The superfinishing was carried out such that the outer surface of the specimen had an arithmetical mean roughness Ra of approximately 0.03 $\mu$m, which was prescribed in JIS B0601-1994.

The specimen was subjected to evaluations of the properties, namely, the surface microhardness of the outer surface layer, the surface residual compressive stress therein, and the residual austenite content therein, as described above. The evaluation results are shown in Table 2.

Subsequently, the rolling contact fatigue life test was carried out to calculate the L50 life and the Weibull coefficient in the same manner as described above. The calculation results are shown in Table 2.

Figure 4:
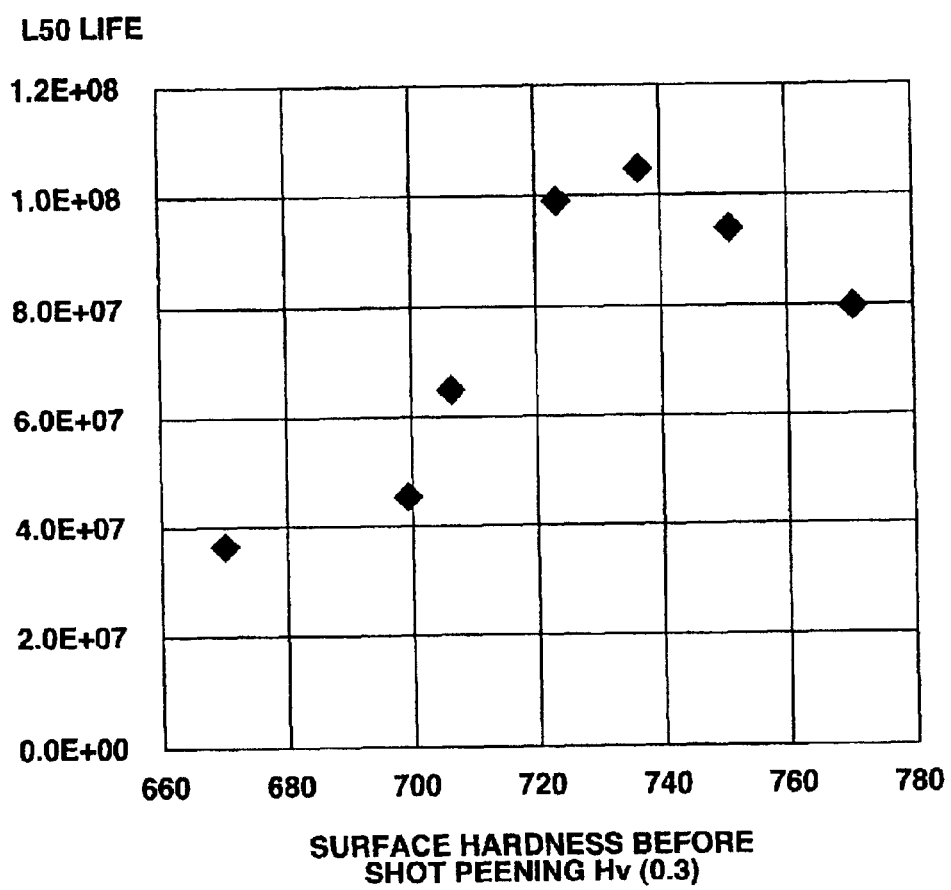
FIG. 4 is a graph showing a relationship between surface hardness of a rolling element specimen before shot peening, and L50 life thereof.

FIG. 4 illustrates a relationship between the surface Vickers hardness Hv of the specimen before shot peening and the L50 life of test piece S, which is obtained from the above-described results of the evaluation and the calculation.

Figure 5:
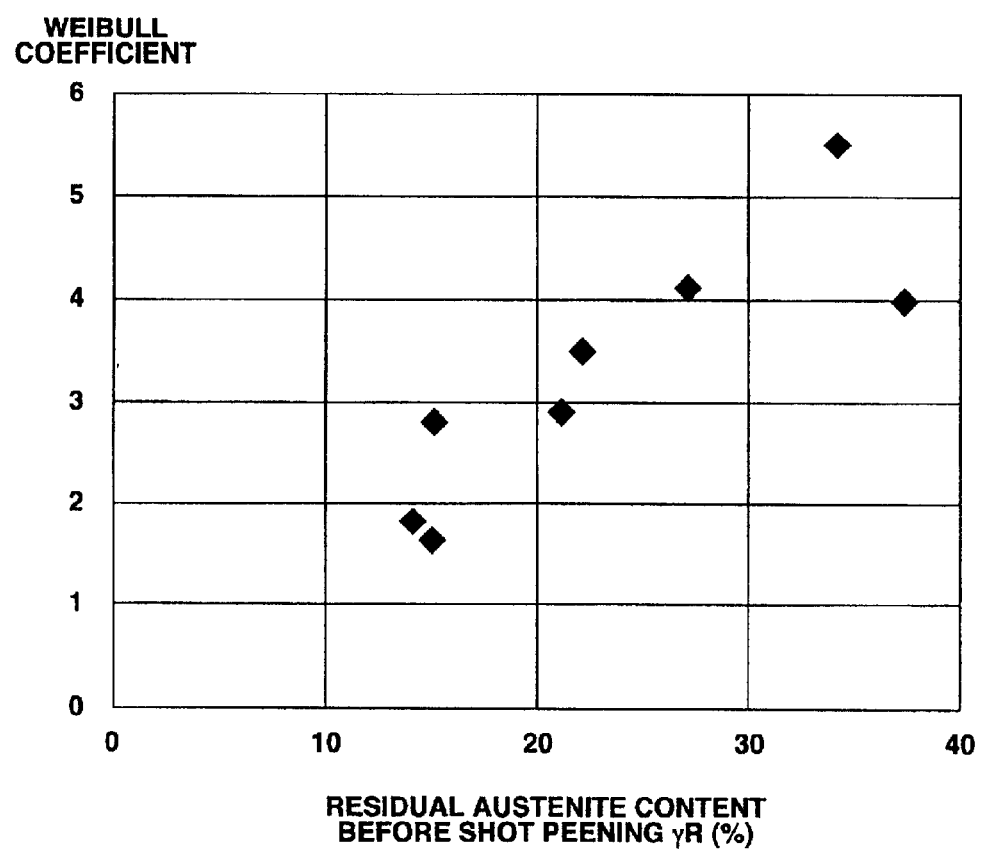
FIG. 5 is a graph showing a relationship between surface residual austenite content in the rolling element specimen before shot peening, and Weibull coefficient.

FIG. 5 illustrates a relationship between the surface residual austenite content γR in the specimen and the Weibull coefficient, which is obtained on the basis of the relationship between the surface residual austenite content in the specimen before shot peening and the L50 life.

Example 8

The specimen was prepared in the same manner as described in Examples 1–7, except that the specimen was not subjected to grinding before shot peening. The specimen before and after shot peening was subjected to the same evaluations of the properties as described in Examples 1–7. The rolling contact fatigue life test was carried out to calculate the L50 life and the Weibull coefficient in the same manner as described in Examples 1–7. The results of the evaluations and the calculations were shown in Table 2.

Example 9

The specimen was prepared in the same manner as described in Examples 1–7, except that gas carburizing was conducted using a gas furnace. The specimen before and after shot peening was subjected to the same evaluations of the properties as described in Examples 1–7. The rolling contact fatigue life test was conducted to calculate of the L50 life and the Weibull coefficient in the same manner as described in Examples 1–7. The results of the evaluations and the calculations were shown in Table 2.

Example 10

The specimen was prepared in the same manner as described in Example 9, except that steel beads having an average particle diameter of 300 μm were used as the shots upon shot peening. The specimen before and after shot peening was subjected to the same evaluations of the properties as described in Examples 1–7. The rolling contact fatigue life test was conducted to calculate the L50 life and the Weibull coefficient in the same manner as described in Examples 1–7. The results of the evaluations and the calculations were shown in Table 2.

Comparative Example 1

The specimen was prepared in the same manner as described in Examples 1–7, except that shot peening was not carried out after the heat treatment under the same conditions as those in Example 3. The thus-prepared specimen was subjected to the same evaluations of the properties as described in Examples 1–7. The rolling contact fatigue life test was conducted to calculate the L50 life and the Weibull coefficient in the same manner as described in Examples 1–7. The results of the evaluations and the calculations were shown in Table 2.

Comparative Example 2

The specimen was prepared in the same manner as described in Examples 9–10, except that the specimen was not subjected to shot peening after subjected to grinding. The thus-prepared specimen was subjected to the same evaluations of the properties as described in Examples 1–7. The rolling contact fatigue life test was conducted to calculate the L50 life and the Weibull coefficient in the same manner as described in Examples 1–7. The results of the evaluations and the calculations were shown in Table 2.

Comparative Example 3

The specimen was prepared in the same manner as described in Examples 1–7, except that the specimen was not subjected to grinding after subjected to the gas carburizing described in Examples 9–10, and was subjected to shot peening, grinding and superfinishing. The specimen before and after shot peening was subjected to the same evaluations of the properties as described in Examples 1–7. The rolling contact fatigue life test was conducted to calculate the L50 life and the Weibull coefficient in the same manner as described in Examples 1–7. The results of the evaluations and the calculations were shown in Table 2.

TABLE 2

| | Properties of Rolling Element Specimen | | |
|---|---|---|---|
| Examples | Surface Microhardness (Hv-0.01 kg) | Surface Residual Compressive Stress (MPa) | Surface Residual Austenite Content (%) |
| Example 1 | 769 | 1050 | <5 |
| Example 2 | 783 | 1100 | <5 |
| Example 3 | 846 | 1250 | 6 |
| Example 4 | 800 | 1140 | <5 |
| Example 5 | 894 | 1450 | 7 |
| Example 6 | 905 | 1530 | <5 |
| Example 7 | 860 | 1290 | <5 |
| Example 8 | 830 | 1100 | <5 |
| Example 9 | 810 | 1350 | <5 |
| Example 10 | 760 | 1080 | 8 |
| Comparative Example 1 | 705 | 620 | 22 |
| Comparative Example 2 | 735 | 680 | 28 |
| Comparative Example 3 | 712 | 800 | <5 |

| | Production Method | | |
|---|---|---|---|
| Examples | Heat Treatment*1 | Working Processes*2 | Average Particle Diameter of Shots (μm) |
| Example 1 | Plasma Carb. 1 | G→S/P→SF | 60 |
| Example 2 | Plasma Carb. 2 | G→S/P→SF | 60 |
| Example 3 | Plasma Carb. 3 | G→S/P→SF | 60 |
| Example 4 | Plasma Carb. 4 | G→S/P→SF | 60 |
| Example 5 | Plasma Carb. 5 | G→S/P→SF | 60 |
| Example 6 | Plasma Carb. 6 | G→S/P→SF | 60 |
| Example 7 | Plasma Carb. 7 | G→S/P→SF | 60 |
| Example 8 | Plasma Carb. 3 | S/P→SF | 60 |
| Example 9 | Gas Carb. 1 | G→S/P→SF | 60 |
| Example 10 | Gas Carb. 1 | G→S/P→SF | 300 |
| Comparative Example 1 | Plasma Carb. 3 | G→SF | — |
| Comparative Example 2 | Gas Carb. 1 | G→SF | — |
| Comparative Example 3 | Gas Carb. 1 | S/P→G, SF | 60 |

Note:
*1 Carb . . . Carburizing
*2 G . . . Grinding
S/P . . . Shot Peening
SF . . . Superfinishing TABLE 2-continued

|  | Properties of Rolling Element Specimen Before Shot Peening | | Endurance Test Results | |
|---|---|---|---|---|
|  | Surface | Surface Residual | | |
| Examples | Vickers Hardness (Hv-0.3 kg) | Austenite Content (%) | L50 Life (cycle) | Weibull Co-efficient |
| Example 1 | 670 | 14 | 3.65E+07 | 1.8 |
| Example 2 | 699 | 15 | 4.57E+07 | 1.6 |
| Example 3 | 705 | 22 | 6.50E+07 | 3.5 |
| Example 4 | 723 | 15 | 9.87E+07 | 2.8 |
| Example 5 | 736 | 34 | 1.05E+08 | 5.5 |
| Example 6 | 750 | 27 | 9.40E+07 | 4.1 |
| Example 7 | 770 | 21 | 7.95E+07 | 2.9 |
| Example 8 | 712 | 24 | 5.83E+07 | 3.3 |
| Example 9 | 735 | 28 | 7.21E+07 | 3.3 |
| Example 10 | 735 | 28 | 3.39E+07 | 2.0 |
| Comparative Example 1 | 705 | 22 | 2.60E+07 | 1.3 |
| Comparative Example 2 | 735 | 28 | 2.95E+07 | 2.8 |
| Comparative Example 3 | 640 | 19 | 1.89E+07 | 3.3 |

It was confirmed from Table 2 that the specimens of Examples 1–10 exhibited good rolling contact fatigue lives significantly improved as compared with those of the specimens of Comparative Examples 1–3.

Further, as seen from FIG. 4, there exists a good relationship between the average of the rolling contact fatigue lives of the specimens and the surface hardness of the specimens before shot peening. As the surface hardness of the specimen becomes higher, the average life can be increased. It was found that when the surface hardness of the specimen before shot peening was within a range of Hv 720 to Hv 760, the maximum life of the specimen could be obtained.

As seen from FIG. 5, there exists a good relationship between the Weibull coefficient and the surface hardness of the specimens before shot peening. As the surface residual austenite content in the specimen before shot peening becomes larger, the Weibull coefficient can be increased, and unevenness in life of the specimen can be suppressed. It was found that a rolling element that had excellent rolling contact fatigue strength and an increased life and exhibited less unevenness in life, could be provided by subjecting a workpiece having the surface hardness of not less than Hv 720 and the surface residual austenite content of not less than 20% to shot peening with shots having an average particle diameter of not more than 0.1 mm.

In addition, it is appreciated that, if carburizing is conducted using a vacuum furnace in the production method of the present invention, substantially the same effects as those in the case of using the plasma furnace in Examples 1–8 can be obtained. Also, if carbonitriding is carried out in the heat treatment, substantially the same effects as those in the case of carburizing conducted in Examples 1–10 can be obtained.

This application is based on a prior Japanese Patent Application No. 2000-391929 filed on Dec. 25, 2000, the entire contents of which is hereby incorporated by reference.

Although the invention has been described above by reference to a certain embodiment and examples of the invention, the invention is not limited to the embodiment and examples described above. Modifications and variations of the embodiment and examples described above will occur to those skilled in the art in light of the above teachings. The scope of the invention is defined with reference to the following claims.

What is claimed is:

1. A method for producing a rolling element for a continuously variable transmission, the rolling element including a plurality of rolling members having rolling contact portions coming into rolling contact with each other via lubricating oil, at least one of the rolling contract portions including an outer surface layer having a surface microhardness of not less than Hv 750, a surface residual compressive stress of not less than 1000 MPa and a residual austenite content of not more than 10% by volume, the method comprising:
   subjecting a workpiece to either one of carburizing-quenching and carbonitriding-quenching;
   subjecting an outer surface of the workpiece subjected to either one of carburizing-quenching and carbonitriding-quenching to shot peening; and
   subjecting the outer surface of the workpiece subjected to shot peening to finish grinding so as to provide the rolling element having the outer surface layer having a surface microhardness of not less than Hv 750, a surface residual compressive stress of not less than 1000 MPa and a residual austenite content of not more than 10% by volume.

2. The method as claimed in claim 1, wherein the either one of carburizing-quenching and carbonitriding-quenching is conducted using either one of a vacuum furnace and a plasma furnace.

3. The method as claimed in claim 1, wherein the workpiece is made of steel containing Cr in an amount of 1.2 to 3.2 mass percent and Mo in an amount of 0.25 to 2.0 mass percent.

4. The method as claimed in claim 3, further comprising subjecting the outer surface of the workpiece to grinding between the either one of carburizing-quenching and carbonitriding-quenching, and the shot peening.

5. The method as claimed in claim 4, wherein the either one of carburizing-quenching and carbonitriding-quenching is conducted using a gas furnace.

6. The method as claimed in claim 1, wherein the shot peening is conducted using shots having an average particle, diameter of not more than 0.1 mm.

7. The method as claimed in claim 1, wherein the outer surface of the workpiece has a hardness of not less than Hv 720 before the shot peening.

8. The method as claimed in claim 7, wherein the hardness is not more than Hv 760.

9. The method as claimed in claim 8, wherein the residual austenite content in the outer surface of the workpiece is not less than 20% by volume before the shot peening.

10. The method as claimed in claim 9, wherein the residual austenite content is not less than 30% by volume.

11. The method as claimed in claim 5, wherein the shot peening is conducted using shots having an average particle diameter of not more than 0.1 mm.

12. The method as claimed in claim 5, wherein the outer surface of the workpiece has a hardness of not less than Hv 720 before the shot peening.

13. The method as claimed in claim 12, wherein the hardness is not more than Hv 760.

14. The method as claimed in claim 13, wherein the residual austenite content in the outer surface of the workpiece is not less than 20% by volume before the shot peening.

15. The method as claimed in claim 14, wherein the residual austenite content is not less than 30% by volume.

16. A rolling element for a continuously variable transmission, comprising:
   a plurality of rolling members having rolling contact portions coming into rolling contact with each other via lubricating oil,
   wherein at least one of the rolling contact portions includes an outer surface layer having a surface microhardness of not less than Hv 750, a surface residual compressive stress of not less than 1000 MPa and a residual austenite content of not more than 10% by volume.

17. A continuously variable transmission, comprising:
   input and output disks arranged in a coaxial and spaced relation to each other; and
   a power roller interposed between the input and output disks, the power roller including an inner race, an outer race and a plurality of balls interposed between the inner and outer races, the inner race and the input and output disks having rolling contact portions coming into rolling contact with each other via lubricating oil, the inner and outer races having rolling contact portions coming into rolling contact with the balls via lubricating oil,
   wherein at least one of the rolling contact portions includes an outer surface layer having a surface microhardness of not less than Hv 750, a surface residual compressive stress of not less than 1000 MPa and a residual austenite content of not more than 10% by volume.

18. The continuously variable transmission as claimed in claim 17, wherein the at least one of the rolling contact portions comprises a traction surface on the inner race of the power roller which is in contact with the input and output disks.

19. The continuously variable transmission as claimed in claim 17, wherein the at least one of the rolling contact portions comprises a traction surface on each of the input and output disks which is in contact with the inner race of the power roller.

20. The continuously variable transmission as claimed in claim 17, wherein the at least one of the rolling contact portions comprises a bearing surface on each of the inner and outer races which is in contact with the balls.

* * * * *